US009542936B2

(12) United States Patent
Lev-Tov et al.

(10) Patent No.: US 9,542,936 B2
(45) Date of Patent: Jan. 10, 2017

(54) FAST OUT-OF-VOCABULARY SEARCH IN AUTOMATIC SPEECH RECOGNITION SYSTEMS

(71) Applicant: Genesys Telecommunications Laboratories, Inc., Daly City, CA (US)

(72) Inventors: Amir Lev-Tov, Bat-Yam (IL); Avi Faizakof, Kfar Warburg (IL); Yochai Konig, San Francisco, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 347 days.

(21) Appl. No.: 13/886,205

(22) Filed: May 2, 2013

(65) Prior Publication Data

US 2014/0188475 A1    Jul. 3, 2014

Related U.S. Application Data

(60) Provisional application No. 61/747,242, filed on Dec. 29, 2012, provisional application No. 61/791,581, filed on Mar. 15, 2013.

(51) Int. Cl.
*G10L 15/00* (2013.01)
*G10L 15/04* (2013.01)
(Continued)

(52) U.S. Cl.
CPC ..... *G10L 15/1815* (2013.01); *G06F 17/30389* (2013.01); *G06F 17/30746* (2013.01); *G10L 15/19* (2013.01); *G10L 15/08* (2013.01)

(58) Field of Classification Search
None
See application file for complete search history.

(56) References Cited

U.S. PATENT DOCUMENTS

| 4,852,180 A | 7/1989 | Levinson |
| 5,625,748 A | 4/1997 | McDonough et al. |

(Continued)

FOREIGN PATENT DOCUMENTS

| CN | 102257800 A | 11/2011 |
| EP | 1484903 A2 | 12/2004 |

(Continued)

OTHER PUBLICATIONS

International Search Report and Written Opinion for PCT/US2013/077712, mailed on Apr. 22, 2014, 12 pages.

(Continued)

*Primary Examiner* — Huyen Vo
*Assistant Examiner* — Thuykhanh Le
(74) *Attorney, Agent, or Firm* — Lewis Roca Rothgerber Christie LLP

(57) ABSTRACT

A method including: receiving, on a computer system, a text search query, the query including one or more query words; generating, on the computer system, for each query word in the query, one or more anchor segments within a plurality of speech recognition processed audio files, the one or more anchor segments identifying possible locations containing the query word; post-processing, on the computer system, the one or more anchor segments, the post-processing including: expanding the one or more anchor segments; sorting the one or more anchor segments; and merging overlapping ones of the one or more anchor segments; and searching, on the computer system, the post-processed one or more anchor segments for instances of at least one of the one or more query words using a constrained grammar.

19 Claims, 13 Drawing Sheets

(51) Int. Cl.
*G10L 21/00* (2013.01)
*G10L 25/00* (2013.01)
*G06F 15/00* (2006.01)
*G10L 15/18* (2013.01)
*G06F 17/30* (2006.01)
*G10L 15/19* (2013.01)
*G10L 15/08* (2006.01)

(56) References Cited

U.S. PATENT DOCUMENTS

| | | | |
|---|---|---|---|
| 6,076,059 A * | 6/2000 | Glickman | G10L 15/26 704/252 |
| 6,212,178 B1 | 4/2001 | Beck et al. | |
| 6,308,154 B1 | 10/2001 | Williams et al. | |
| 6,363,346 B1 | 3/2002 | Walters | |
| 6,404,857 B1 | 6/2002 | Blair et al. | |
| 6,542,602 B1 | 4/2003 | Elazar | |
| 6,594,629 B1 | 7/2003 | Basu et al. | |
| 6,678,658 B1 | 1/2004 | Hogden et al. | |
| 6,687,671 B2 | 2/2004 | Gudorf et al. | |
| 6,721,416 B1 | 4/2004 | Farrell | |
| 6,724,887 B1 | 4/2004 | Eilbacher et al. | |
| 6,895,083 B1 | 5/2005 | Bers et al. | |
| 6,910,072 B2 | 6/2005 | Macleod Beck et al. | |
| 6,959,080 B2 | 10/2005 | Dezonno et al. | |
| 7,065,493 B1 | 6/2006 | Homsi | |
| 7,092,888 B1 | 8/2006 | McCarthy et al. | |
| 7,487,094 B1 | 2/2009 | Konig et al. | |
| 8,275,110 B2 | 9/2012 | Vendrow | |
| 8,463,606 B2 | 6/2013 | Scott et al. | |
| 8,600,756 B2 | 12/2013 | Pickering et al. | |
| 8,654,963 B2 | 2/2014 | Anisimov et al. | |
| 8,767,947 B1 | 7/2014 | Ristock et al. | |
| 2002/0029161 A1 | 3/2002 | Brodersen et al. | |
| 2002/0112055 A1 | 8/2002 | Capers et al. | |
| 2002/0138468 A1 | 9/2002 | Kermani | |
| 2002/0147592 A1 * | 10/2002 | Wilmot | G06F 17/3061 704/270.1 |
| 2003/0088403 A1 | 5/2003 | Chan et al. | |
| 2003/0145071 A1 | 7/2003 | Straut et al. | |
| 2003/0187649 A1 * | 10/2003 | Logan | G06F 17/30017 704/260 |
| 2004/0024598 A1 | 2/2004 | Srivastava et al. | |
| 2004/0062364 A1 | 4/2004 | Dezonno et al. | |
| 2004/0083195 A1 | 4/2004 | McCord et al. | |
| 2005/0203738 A1 * | 9/2005 | Hwang | G10L 15/063 704/243 |
| 2005/0240594 A1 | 10/2005 | McCormack et al. | |
| 2006/0075347 A1 * | 4/2006 | Rehm | G06F 3/16 715/727 |
| 2007/0038499 A1 | 2/2007 | Margulies et al. | |
| 2007/0198322 A1 | 8/2007 | Bourne et al. | |
| 2007/0198330 A1 | 8/2007 | Korenblit et al. | |
| 2008/0120164 A1 | 5/2008 | Hassler | |
| 2008/0221893 A1 * | 9/2008 | Kaiser | G10L 15/24 704/257 |
| 2009/0018890 A1 | 1/2009 | Werth et al. | |
| 2009/0030680 A1 * | 1/2009 | Mamou | G06F 17/30746 704/235 |
| 2009/0037176 A1 * | 2/2009 | Arrowood | 704/253 |
| 2009/0132243 A1 * | 5/2009 | Suzuki | G10L 21/04 704/216 |
| 2009/0225971 A1 | 9/2009 | Miller et al. | |
| 2009/0326947 A1 | 12/2009 | Arnold et al. | |
| 2010/0131642 A1 * | 5/2010 | Chalikouras | G06Q 30/0241 709/224 |
| 2010/0172485 A1 | 7/2010 | Bourke et al. | |
| 2010/0246784 A1 | 9/2010 | Frazier et al. | |
| 2010/0278453 A1 * | 11/2010 | King | G06Q 10/10 382/321 |
| 2010/0296417 A1 | 11/2010 | Steiner | |
| 2011/0010624 A1 * | 1/2011 | Vanslette | G06F 3/0485 715/704 |
| 2011/0071833 A1 | 3/2011 | Shi et al. | |
| 2011/0125498 A1 | 5/2011 | Pickering et al. | |
| 2011/0131198 A1 * | 6/2011 | Johnson | G06F 17/30498 707/714 |
| 2011/0153378 A1 | 6/2011 | Costello et al. | |
| 2011/0172994 A1 * | 7/2011 | Lindahl | G06F 3/167 704/211 |
| 2011/0178803 A1 | 7/2011 | Petrushin | |
| 2011/0191106 A1 | 8/2011 | Khor et al. | |
| 2011/0255682 A1 | 10/2011 | Flockhart et al. | |
| 2011/0255683 A1 | 10/2011 | Flockhart et al. | |
| 2011/0257972 A1 | 10/2011 | Agevik | |
| 2012/0209609 A1 * | 8/2012 | Zhao | G10L 15/08 704/249 |
| 2012/0232904 A1 * | 9/2012 | Zhu | G10L 15/22 704/254 |
| 2013/0083916 A1 | 4/2013 | Flockhart et al. | |
| 2013/0090921 A1 * | 4/2013 | Liu | G10L 15/22 704/10 |
| 2013/0094702 A1 * | 4/2013 | Rodriguez | G06F 21/10 382/103 |
| 2013/0132583 A1 | 5/2013 | McCord | |
| 2013/0246053 A1 | 9/2013 | Scott et al. | |
| 2013/0273976 A1 * | 10/2013 | Rao | H04L 12/1822 455/563 |
| 2013/0275135 A1 * | 10/2013 | Morales | G10L 15/065 704/236 |
| 2013/0346077 A1 * | 12/2013 | Mengibar | G10L 15/265 704/235 |
| 2014/0079210 A1 | 3/2014 | Kohler et al. | |
| 2014/0119535 A1 | 5/2014 | Anisimov et al. | |
| 2014/0146961 A1 | 5/2014 | Ristock et al. | |
| 2014/0163960 A1 * | 6/2014 | Dimitriadis | G10L 25/63 704/9 |
| 2014/0172419 A1 * | 6/2014 | John | G06F 17/30746 704/201 |
| 2014/0218461 A1 * | 8/2014 | DeLand | H04L 12/1813 348/14.07 |
| 2014/0289658 A1 * | 9/2014 | Gelernter | G06F 9/4443 715/765 |
| 2014/0324426 A1 * | 10/2014 | Lu | G06Q 10/1097 704/242 |
| 2014/0337072 A1 | 11/2014 | Tamblyn et al. | |

FOREIGN PATENT DOCUMENTS

| | | |
|---|---|---|
| EP | 1402520 B1 | 10/2006 |
| GB | 2451938 A | 2/2009 |
| JP | 2005504452 A | 2/2005 |
| JP | 2005012781 A | 6/2012 |
| JP | 2012513165 A2 | 6/2012 |
| JP | 561635792 B2 | 10/2014 |
| KR | 1020110097853 A | 8/2011 |
| WO | 02065741 A2 | 8/2002 |
| WO | 2010080323 A2 | 7/2010 |
| WO | WO 2012/033505 A1 | 3/2012 |
| WO | 2014085760 A1 | 6/2014 |

OTHER PUBLICATIONS

European Search Report for Application No. 13866559.1, dated Dec. 7, 2015, 8 pages.
Logan, Beth et al., Approaches to Reduce the Effects of OOV Queries on Indexed Spoken Audio, Cambridge Research Laboratory, HP Laboratories Cambridge, HPL-2003-46, Mar. 5, 2003, 18 pages.
Chinese Office Action dated May 13, 2013 for Chinese Application 200980151195.7 with English Translation, 15 pages.
Chinese Office Action for CN Application No. 200980151195.7, with Machine English Translation, dated Dec. 25, 2013, 12 pages.
Examination Office Letter dated Jan. 24, 2013 for Japanese Application 2011-542265, 4 pages.
International Search Report dated Feb. 28, 2014 for PCT/US2013/072484, 4 pages.
International Search Report dated Sep. 12, 2014 for PCT/US2014/037587, 13 pages.

(56) References Cited

OTHER PUBLICATIONS

Japanese Office Action, issued in JP Application No. 2011-542265, with Machine English Translation, mailed Jan. 23, 2014, 4 pages.
Johnson, Sue, Describe what is meant by the term "keyword spotting" and describe the techniques used to implement such a recognition system, Mphil Computer Speech and Language Processing Speech Recognition Essay, Apr. 24, 1997, 26 pages.
Korean Preliminary Rejection dated Jul. 17, 2012 for Korean Application No. 10-2011-7014074, with English Translation, 10 pages.
Koutras A., et al., "Blind Speech Separation of Moving Speakers in Real Reverberant Environments," WCL, Electrical & Computer Engineering Department, University of Patras, 26100 Patras, Hellas, 4 pages.
Written Opinion of the International Searching Authority for International Application PCT/US09/67441 dated Jun. 28, 2010, 5 pages.

\* cited by examiner

FIG. 5

FAST OUT-OF-VOCABULARY SEARCH IN AUTOMATIC SPEECH RECOGNITION SYSTEMS

CROSS-REFERENCE TO RELATED APPLICATION(S)

The present application claims the benefit of U.S. Provisional Patent Application No. 61/747,242, filed in the United States Patent and Trademark Office on Dec. 29, 2012, the entire content of which is incorporated herein by reference. The present application also claims the benefit of U.S. Provisional Patent Application No. 61/791,581, filed in the United States Patent and Trademark Office on Mar. 15, 2013, the entire content of which is incorporated herein by reference.

FIELD

Aspects of the present invention relate to speech processing, indexing, and searching. In particular, aspects of the present invention relate to searching for a phrase containing at least one Out-Of-Vocabulary (OOV) word in an Automatic Speech Recognition (ASR) system such as a Large Vocabulary Continuous Speech Recognition (LVCSR) system or a similarly suitable system.

BACKGROUND

In many contexts, users of large collections of recorded audio (audio information) value the ability to quickly perform searches for words or phrases in the audio. For example, in the context of corporate contact centers (e.g., call-in centers), recorded conversations between customers and customer service representatives (or agents) can be searched and analyzed to identify trends in customer satisfaction or customer issues, to monitor the performance of various support agents, and to locate calls relating to particular issues. As another example, searchable recordings of classroom lectures would allow students to search for and replay discussions of topics of particular interest. Searchable voicemail messages would also allow users to quickly find audio messages containing particular words. As another example, searchable recordings of complex medical procedures (e.g., surgery) can be used to locate recordings of procedures involving uses of particular devices, choices of approaches during the procedure, and various complications.

Generally, Automatic Speech Recognition (ASR) systems, and Large Vocabulary Continuous Speech Recognition (LVCSR) transcription engines in particular, include three components: A set of Language Models (LM), a set of Acoustic Models (AM), and a decoder. The LM and AM are often trained by supplying audio files and their transcriptions (e.g., known, correct transcriptions) to a learning module. Generally, the LM is a Statistical LM (SLM). The training process uses a dictionary (or "vocabulary") which maps recognized written words into sequences of sub-words (e.g., phonemes or syllables) During recognition of speech, the decoder analyzes an audio clip (e.g., an audio file) and outputs a sequence of recognized words.

A collection of audio files (e.g., calls in a call center or set of lectures in a class) can be made searchable by processing each audio file using an LVCSR engine to generate a text transcript file in which each written word in the transcript (generally) corresponds to a spoken word in the audio file. The resulting text can then be indexed by a traditional text-based search engine such as Apache Lucene™. A user can then query the resulting index (e.g., a search index database) to search the transcripts.

Generally, the recognized words in the output of a LVCSR engine are selected from (e.g., constrained to) the words contained in the dictionary (or "vocabulary") of the ASR system. A word that is not in the vocabulary (an "out-of-vocabulary" or "OOV" word) may be recognized (e.g., with low confidence) as a word that is in the vocabulary. For example, if the word "Amarillo" is not in the vocabulary, the LVCSR engine may transcribe the word as "ambassador" in the output. As such, when using such ASR systems, it may be impossible for an end user to search the index for any instances of words that are not in the vocabulary.

One way to overcome this problem is to add the OOV word to the dictionary (i.e., to add the word to the vocabulary) and to generate a new LM (which can be a SLM or a constrained grammar) and then reprocess the audio files. However, such an approach would increase the delay in generating the search results due to the need to reprocess the audio corpus.

In other ASR systems, the output data is sub-word level recognition data such as a phonetic transcription of the audio rather than a LVCSR output or a similar word based transcript. Such ASR systems typically do not include a word vocabulary. Instead, these engines provide a way to search for any sequence of characters. In this case, the search is performed by mapping the search phrase into a sequence of phonemes and searching for the given phonetic sequences in the phonetic transcription index. These engines are generally considered to be less accurate than LVCSR based engines because the notion of words is not inherent to the recognition process, and the use of words (e.g., the meanings of the words) are generally useful for improving the accuracy of the speech recognition.

Generally, combining word and phoneme levels of automatic speech recognition will not solve the accuracy problems of phonetic-based methods given that, the accuracy limitations of purely phonetics-based methods would still persist for queries that included at least one OOV word.

SUMMARY

Aspects of embodiments of the present invention are directed toward systems and methods of searching spoken audio content given an LVCSR output, in which the search query contains at least one OOV word.

An embodiment of the present invention is directed to a spoken document retrieval system and method for a fast processing of an Out-Of-Vocabulary (OOV) query in an audio file corpus that is analyzed by a LVCSR (Large Vocabulary Continuous Speech Recognition) or similar system. The "OOV query" is a user-provided search phrase of one or more words, at least one of which is OOV, where the referred vocabulary (its dictionary) here is the list of distinct words on which the system has been trained. Given a query and an index of LVCSR results, the system distinguishes between OOV and IV (In-Vocabulary) words from the query, and generates, for each word, a list of anchors (i.e., places in the audio to look for words in the search query). These anchor locations are reprocessed in a modified recognition phase to generate new search events. Because anchors span a relatively small part of the entire audio file (and hence, a relatively small part of the audio corpus), the search is much faster than a conventional method of reprocessing the entire audio file corpus.

In one embodiment of the present invention, the spoken document retrieval system is used in the context of a contact center (e.g., a call center). In such circumstances, customers place calls to a company's contact center, and the contact center records the call. An LVCSR based ASR system processes the calls to generate output transcriptions and indexes these transcriptions. Later, users such as customer support agents and supervisors can search the indexed transcriptions for particular keywords such as types of issues encountered, place names, names products, error messages, error codes, etc.

However, embodiments of the present invention are not limited to conversations between people, but may be applied to any speech corpora from any source, such as medical dictation, television programs, podcasts, academic lectures, recorded presentations, etc.

According to one embodiment of the present invention, a method includes: receiving, on a computer system, a text search query, the query including one or more query words; generating, on the computer system, for each query word in the query, one or more anchor segments within a plurality of speech recognition processed audio files, the one or more anchor segments identifying possible locations containing the query word; post-processing, on the computer system, the one or more anchor segments, the post-processing including: expanding the one or more anchor segments; sorting the one or more anchor segments; and merging overlapping ones of the one or more anchor segments; and performing, on the computer system, speech recognition on the post-processed one or more anchor segments for instances of at least one of the one or more query words using a constrained grammar.

The audio files may be processed by a speech recognizer engine, and the generating, for each query word in the query, the one or more anchor segments of the processed audio files may include: determining if the query word is in a vocabulary of a learning model of the speech recognizer engine; when the query word is in the vocabulary, identifying one or more high confidence anchor segments corresponding to the query word; and when the query word is not in the vocabulary, generating a search list of one or more sub-words of the query word and identifying one or more anchor segments containing at least one of the one or more sub-words.

The generating the one or more anchor segments may further include: collecting low confidence words in the audio files, the low confidence words having word confidences below a threshold, and the identifying the one or more anchor segments corresponding to each of the sub-words may include searching the low confidence words for only the sub-words of the query word when the query word is not in the vocabulary.

The constrained grammar may include one or more out-of-vocabulary query words of the query, wherein each of the out-of-vocabulary query words is not in the vocabulary.

The searching may include computing one or more event confidence levels, each of the event confidence levels corresponding to a confidence that an anchor segment of the one or more anchor segments contains a particular query word of the one or more query words of the query.

The method may further include outputting, from the computer system, a result of the searching, wherein the result includes the instances of the one or more query words in the audio file, sorted by event confidence level.

The method may further include: applying, on the computer system, a utility function to each of the one or more anchor segments to compute one or more corresponding anchor utility values; and sorting, on the computer system, the one or more anchor segments in accordance with the one or more anchor utility values.

The searching the one or more post-processed anchor segments may only search the one or more post-processed anchor segments having best anchor utility values of the one or more anchor utility values.

The expanding the one or more anchor segments may include: for each query word in the query: counting a first number of characters in the query before the query word and a second number of characters after the query word; multiplying the first number of characters by an average character duration to obtain a first expansion amount; and multiplying the second number of characters by the average character duration to obtain a second expansion amount; and for each anchor segment, each anchor segment being identified by an anchor word, a start time, and an end time: subtracting the first expansion amount and a first constant expansion duration from the start time; and adding the second expansion amount and a second constant expansion duration to the end time.

According to another embodiment of the present invention, a system includes a computer system including a processor, memory, and storage, the system being configured to: receive a text search query, the query including one or more query words; generate, for each query word in the query, one or more anchor segments within a plurality of speech recognition processed audio files, the one or more anchor segments identifying possible locations containing the query word; post-process the one or more anchor segments, the post-process including: expanding the one or more anchor segments; sorting the one or more anchor segments; and merging overlapping ones of the one or more anchor segments; and perform speech recognition on the one or more post-processed anchor segments for instances of at least one of the one or more query words using a constrained grammar.

The system may be further configured to process the audio files using a speech recognizer engine, and wherein the system may be further configured to generate, for each query word in the query, the one or more anchor segments of the processed audio files by: determining if the query word is in a vocabulary of a learning model of the speech recognizer engine; when the query word is in the vocabulary, identifying one or more high confidence anchor segments corresponding to the query word; and when the query word is not in the vocabulary, generating a search list of one or more sub-words of the query word and identifying one or more anchor segments corresponding to each of the one or more sub-words.

The system may be further configured to collect low confidence words in the audio files, the low confidence words having word confidences below a threshold, and wherein the identifying the one or more anchor segments corresponding to each of the sub-words may include searching the low confidence words for only the sub-words of the query word when the query word is not in the vocabulary.

The constrained grammar may include one or more out-of-vocabulary query words of the query, wherein each of the out-of-vocabulary query words is not in the vocabulary.

The system may be further configured to search the one or more post-processed anchor segments by computing one or more event confidence levels, each of the event confidence levels corresponding to a confidence that an anchor segment of the one or more anchor segments contains a particular query word of the one or more query words of the query.

The system may be further configured to output a result of the search, wherein the result includes the instances of the query words in the audio file, sorted by event confidence level.

The system may be further configured to: apply a utility function to each of the one or more anchor segments to compute one or more corresponding anchor utility values; and sort the one or more anchor segments in accordance with the one or more anchor utility values.

The system may be configured to search the one or more post-processed anchor segments by only searching the one or more anchor segments having best anchor utility values of the one or more anchor utility values.

The system may be further configured to expand the one or more anchor segments by: for each query word in the query: counting a first number of characters in the query before the query word and a second number of characters after the query word; multiplying the first number of characters by an average character duration to obtain a first expansion amount; and multiplying the second number of characters by the average character duration to obtain a second expansion amount; and for each anchor segment, each anchor segment being identified by an anchor word, a start time, and an end time: subtracting the first expansion amount and a first constant expansion duration from the start time; and adding the second expansion amount and a second constant expansion duration to the end time.

According to another embodiment of the present invention, a system includes: means for receiving a text search query, the query including one or more query words; means for generating, for each query word in the query, one or more anchor segments identifying possible locations within a plurality of speech recognition processed audio files, the one or more anchor segments identifying possible locations containing the query word; means for post-processing the one or more anchor segments including: means for expanding the one or more anchor segments; means for sorting the one or more anchor segments; and means for merging overlapping ones of the one or more anchor segments; and means for searching the post-processed one or more anchor segments for instances of at least one of the one or more query words using a constrained grammar.

BRIEF DESCRIPTION OF THE DRAWINGS

The accompanying drawings, together with the specification, illustrate exemplary embodiments of the present invention, and, together with the description, serve to explain the principles of the present invention.

FIG. 5 is a screenshot of a user interface for searching a collection of audio files and displaying a collection of results in accordance with one embodiment of the present invention.

DETAILED DESCRIPTION

Figure 1:
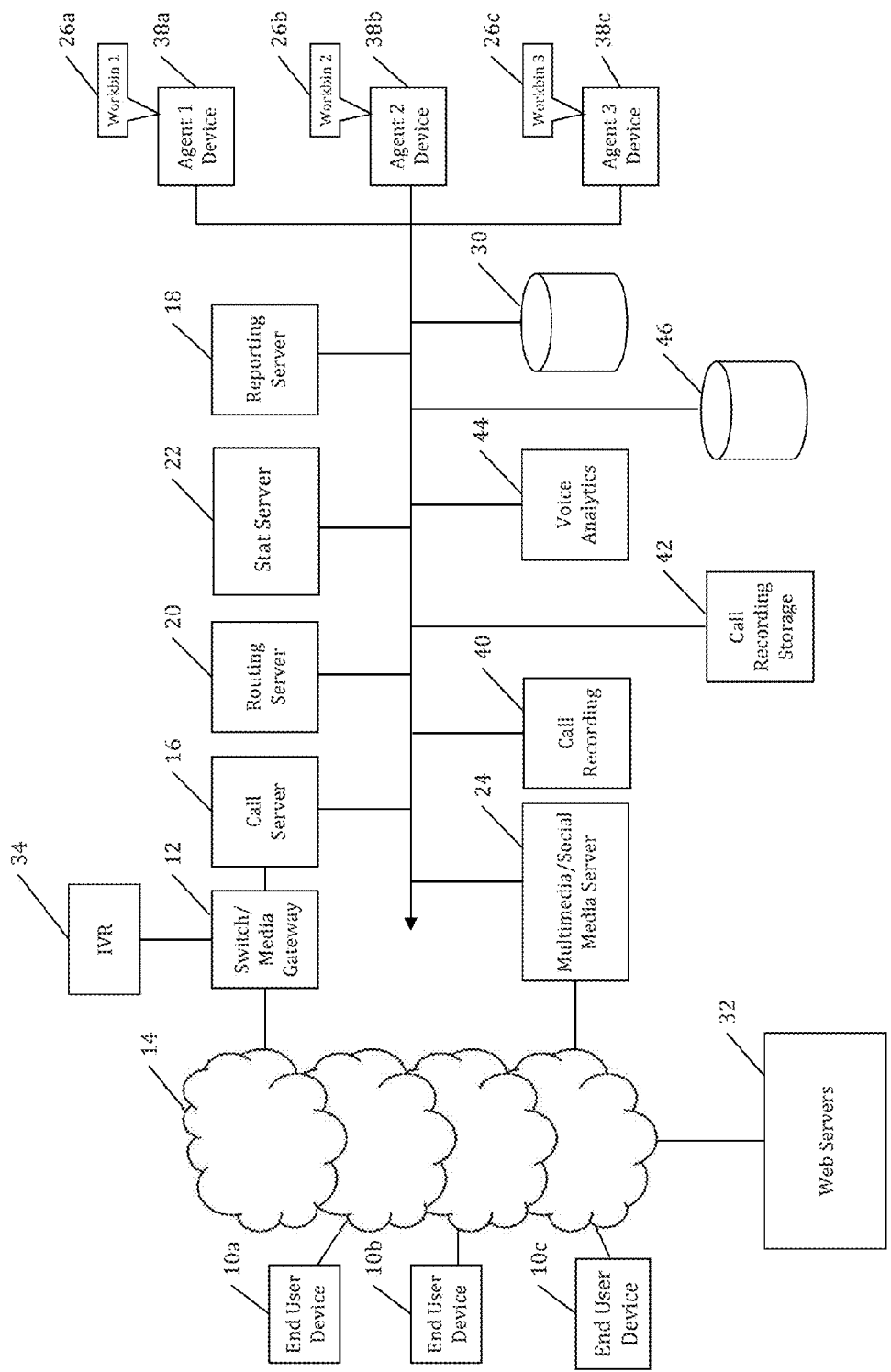
FIG. 1 is a schematic block diagram of a system supporting a contact center that is configured to provide access to searchable transcripts to customer service agents according to one exemplary embodiment of the invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Some embodiments of the present invention will be described in the context of a contact center. However, embodiments of the present invention are not limited thereto and may also be used in under other conditions involving searching recorded audio such as in computer based education systems, voice messaging systems, medical transcripts, or any speech corpora from any source.

FIG. 1 is a schematic block diagram of a system supporting a contact center 102 that is configured to provide customer availability information to customer service agents according to one exemplary embodiment of the invention. The contact center 102 may be an in-house facility to a business or corporation for serving the enterprise in performing the functions of sales and service relative to the products and services available through the enterprise. In another aspect, the contact center 102 may be a third-party service provider. The contact center 102 may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center 102 includes resources (e.g. personnel, computers, and telecommunication equipment) to enable delivery of services via telephone or other communication mechanisms. Such services may vary depending on the type of contact center, and may be customer service to help desk, emergency response, telemarketing, order taking, and the like.

Customers, potential customers, or other end users (collectively referred to as customers) desiring to receive services from the contact center 102 may initiate inbound calls to the contact center 102 via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center 102 includes a switch/media gateway 12 coupled to the communications network 14 for receiving and transmitting calls between end users and the contact center 102. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling systems of the contact center 102.

The contact center 102 may also include a multimedia/social media server for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center 102. End users may browse the web pages and get information about the enterprise's products and services. The web pages may also provide a mechanism for contacting the contact center 102, via, for example, web chat, voice call, email, web real time communication (WebRTC), or the like.

According to one exemplary embodiment of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 18 which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls.

In one example, while an agent is being located and until such agent becomes available, the call server may place the call in, for example, a call queue. The call queue may be implemented via any data structure conventional in the art, such as, for example, a linked list, array, and/or the like. The data structure may be maintained, for example, in buffer memory provided by the call server 18.

Once an appropriate agent is available to handle a call, the call is removed from the call queue and transferred to a corresponding agent device 38a-38c (collectively referenced as 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center 102 and performing data processing associated with contact center operations, and for interfacing with customers via a variety of communication mechanisms such as chat, instant messaging, voice calls, and the like.

The selection of an appropriate agent for routing an inbound call may be based, for example, on a routing strategy employed by the routing server 20, and further based on information about agent availability, skills, and other routing parameters provided, for example, by a statistics server 22.

The multimedia/social media server 24 may also be configured to provide, to an end user, a mobile application for downloading onto the end user device 10. The mobile application may provide user configurable settings that indicate, for example, whether the user is available, not available, or availability is unknown, for purposes of being contacted by a contact center agent. The multimedia/social media server 24 may monitor the status settings and send updates to the aggregation module each time the status information changes.

The contact center 102 may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the contact center 102 also includes one or more mass storage devices 30 for storing different databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be provided by a third party database such as, for example, a third party customer relations management (CRM) database. The mass storage device may take form of a hard disk or disk array as is conventional in the art.

According to one embodiment of the present invention, the contact center 102 also includes a call recording server 40 for recording the audio of calls conducted through the contact center 102, a call recording storage server 42 for storing the recorded audio, a speech analytics server 44 configured to process and analyze audio collected in the from the contact center 102, and a speech index database 46 for providing an index of the analyzed audio.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2:
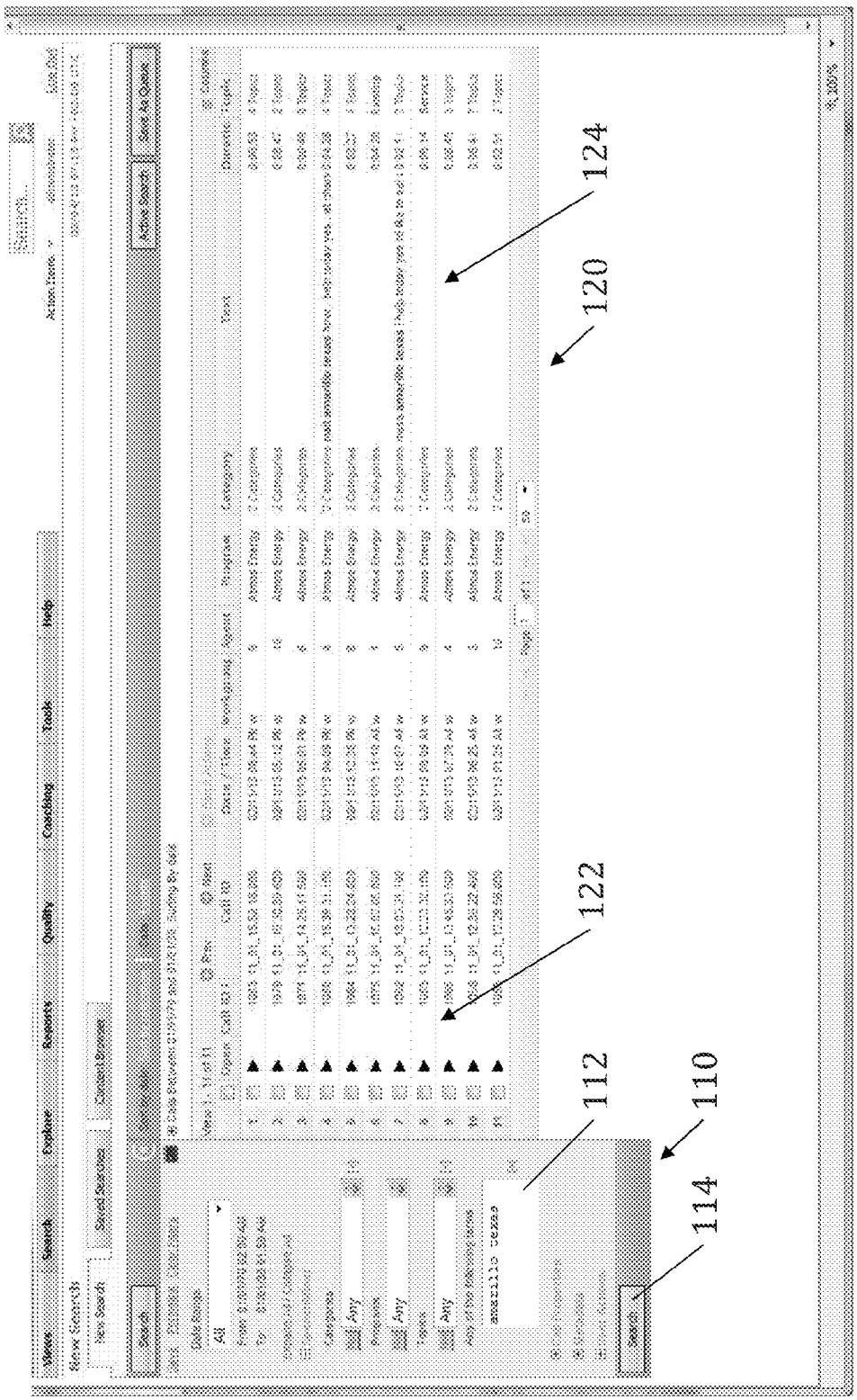
FIG. 2 is a screenshot of a user interface for searching a collection of audio files in accordance with one embodiment of the present invention.

Referring to FIG. 2, a search pane 110 includes a search query input box 112 for supplying one or more keywords to search and a "search" button 114 for initiating a search. The search pane 110 may also include other parameters to further narrow searches based on metadata such as a date range, a category, a topic, and other metadata specific to the particular environment in which the user interface is operating. For example, in the context of searching call recordings recorded in a call center, the search pane may also allow searching based on agent identifier, and call properties such as call length, time of day, call department, caller location, etc. After entering a set of parameters, a user can click the "search" button 114 to send the request to the speech analytics server 44, which processes the request by searching the speech index database 46.

The user interface shown in FIG. 2 also includes a results pane 120, which displays a list of audio recordings 122 matching the criteria searched for in the search pane 110. The result pane may include a "text" column 124 which displays a portion of a transcript of a portion of the audio matching the text search query entered in search query input box 112 of the search pane 110.

Figure 3:
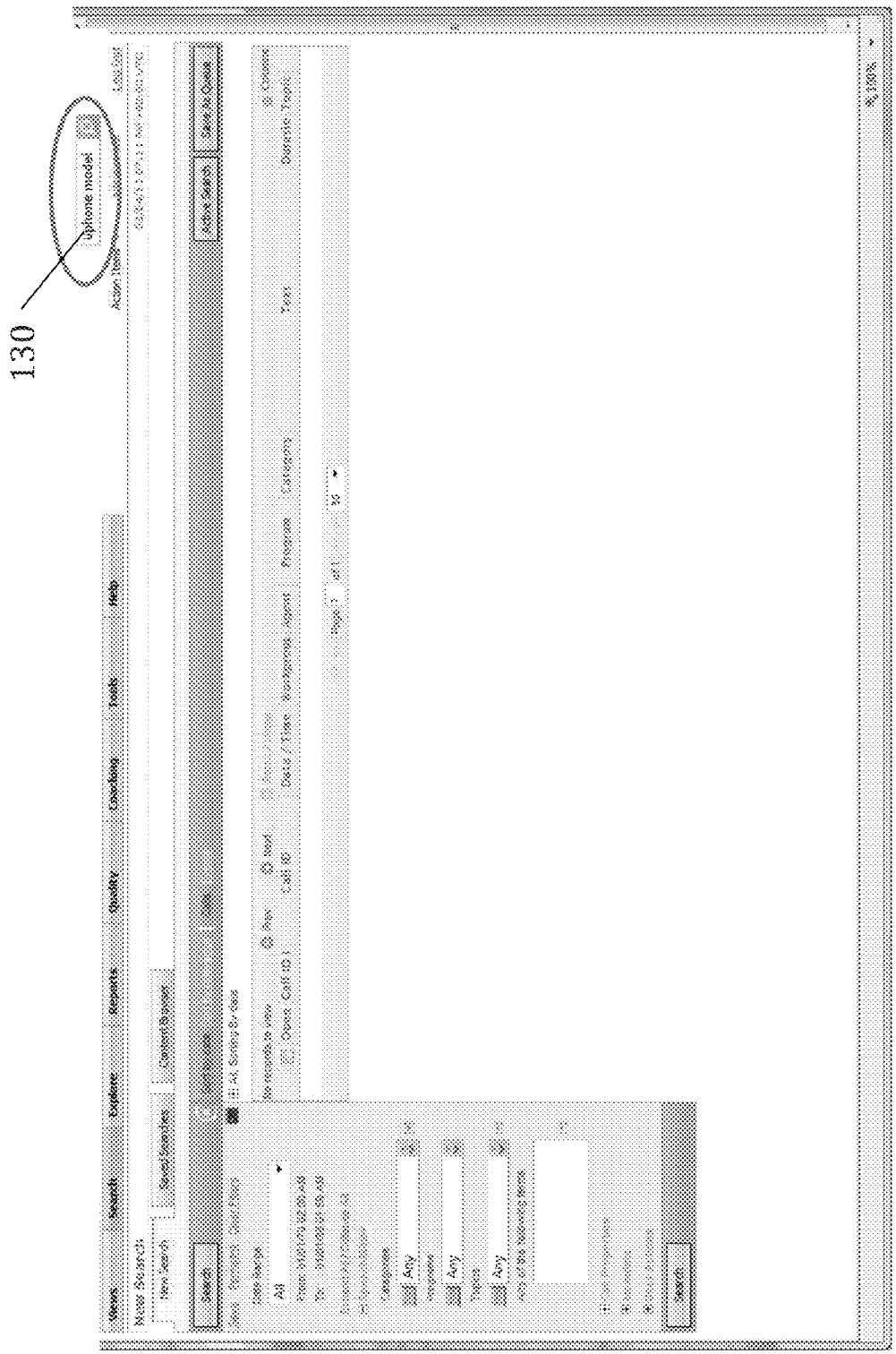
FIG. 3 is a screenshot of a user interface for searching a collection of audio files in accordance with another embodiment of the present invention.

Referring to FIG. 3, according to one embodiment, a quick search input box 130 may also be provided for searching the speech index database 46.

Figure 4:
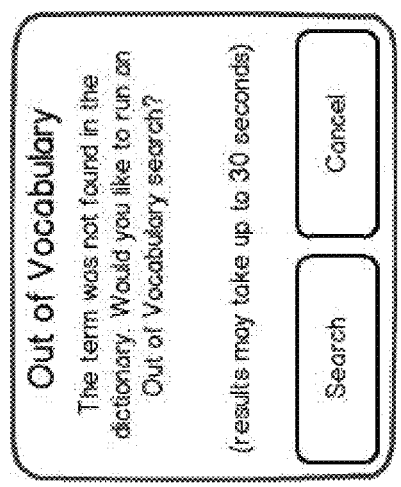
FIG. 4 is a screenshot of a user interface requesting confirmation to perform an out-of-vocabulary search in accordance with embodiment of the present invention.

FIG. 4 is a screenshot of a dialog box according to one embodiment, where the dialog box prompts a user to select whether to perform an out-of-vocabulary search because the query includes one or more out-of-vocabulary terms.

Figure 5:
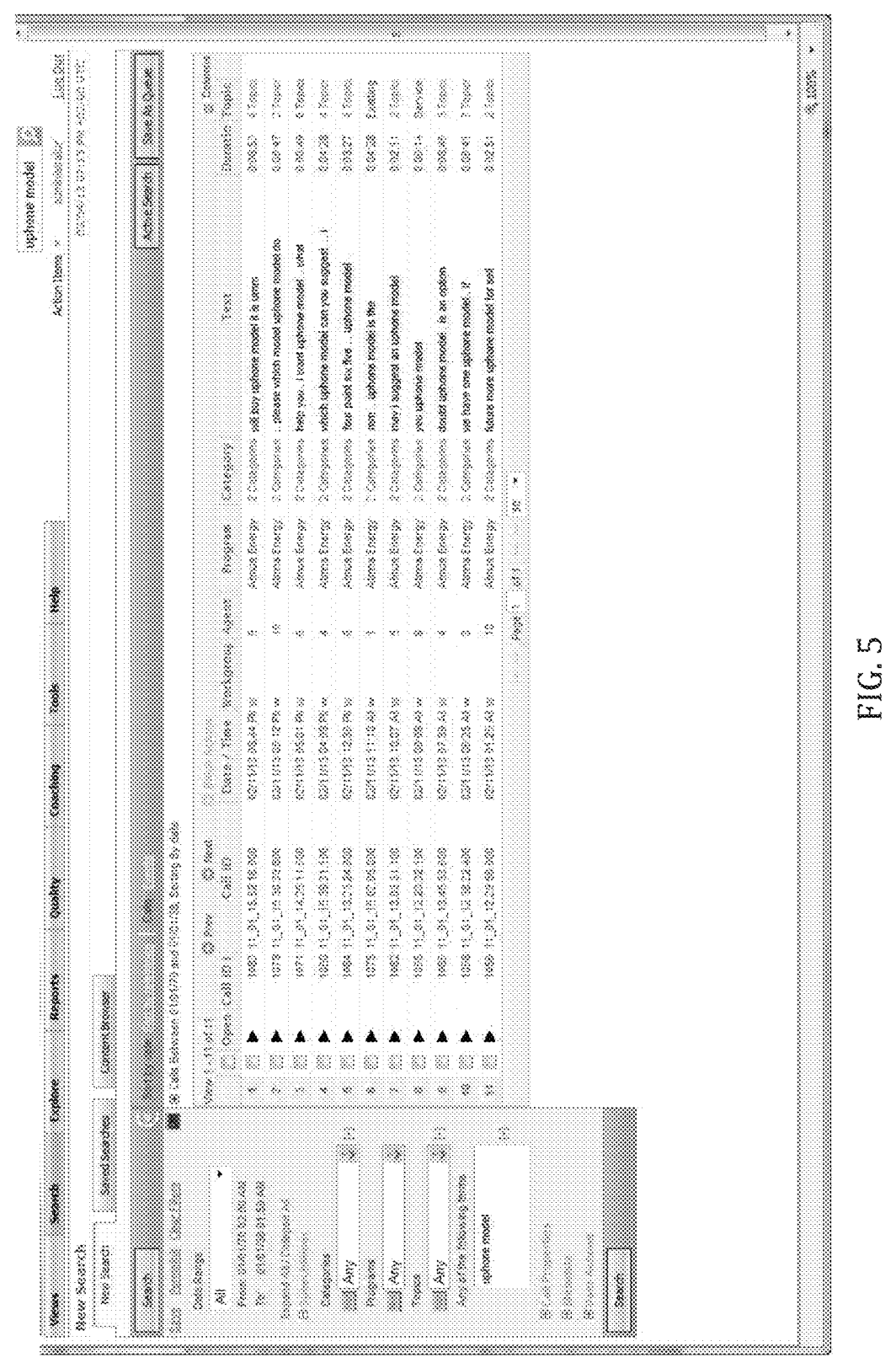

FIG. 5 is a screenshot of a search interface according to one embodiment, where the search interface shows multiple audio recordings matching the search phrase.

Figure 6:
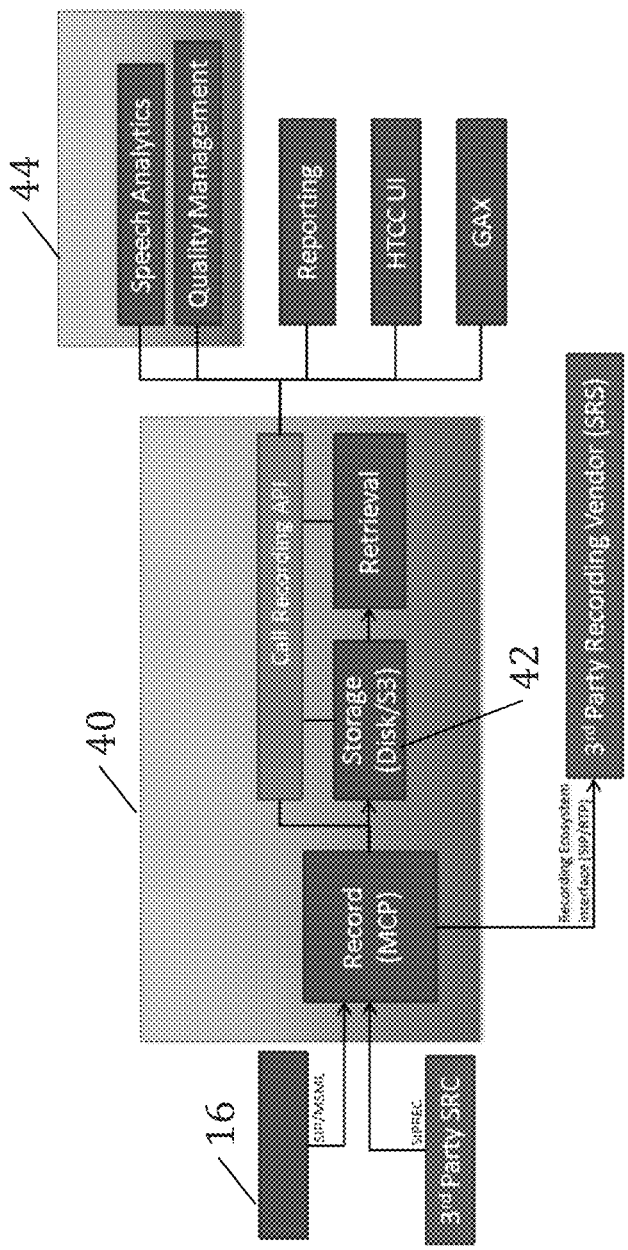
FIG. 6 is a schematic block diagram illustrating logical connections for integrating a speech analytics server with a contact center call processing system according to one embodiment of the present invention.

FIG. 6 is a schematic block diagram illustrating logical connections for integrating a speech analytics server with a contact center call processing system according to one embodiment of the present invention. Referring also to FIG. 1, Calls processed through a call server (e.g., a SIP server) 16 are recorded by a call recording server 40, which stores the calls in a call recording storage server 42. In various embodiments of the present invention, call recording storage server 42 may be a local disk, a dedicated file server, or a cloud-based data storage service (e.g., Amazon® S3). Calls that are recorded using the call recording server may also be processed by the speech analytics server 44. The call recording server 40 may be a Session Initiation Protocol (SIP) recording server which may operate in accordance with systems as described in, for example, IETF RFC 6341 or as provided by, for example, Genesys® SIP Server.

Figure 7:
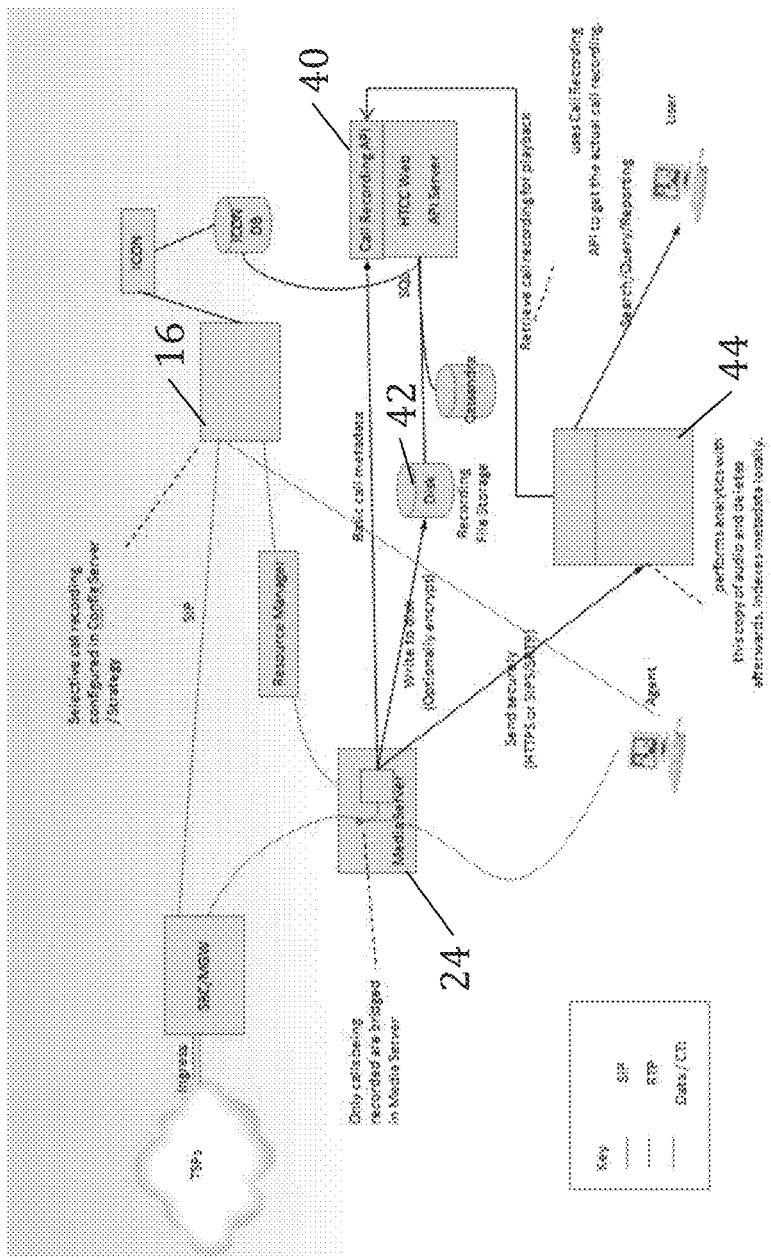
FIG. 7 is a more detailed schematic block diagram illustrating logical connections for integrating a speech analytics server with a contact center call processing system according to one embodiment of the present invention.

Referring to FIG. 7, according to one embodiment, the recorded call information is provided by media server 24 directly to the speech analytics server 44. To provide higher quality analytics, a speech analytics engine implemented in the speech analytics server 44 generally receives audio from the call without further encoding (e.g., without further compression). In this embodiment, the media server 24 creates two copies of audio data: 1) the first one to be saved in the call recording storage server 42 for playback and archival purposes. That copy of audio data should be compressed to save on storage space and so as to be readable in a wide range of contexts. For example, the audio may be stored in an MPEG-Audio Layer 3 (MP3) format so that any HTML5 browser can playback without an additional plugin. 2) The second copy of the audio (uncompressed or losslessly compressed) may be sent to the speech analytics server 44 without any transcoding performed, e.g., stored as in a pulse-code modulation (PCM) format such as the WAV audio file format if a file container is required. The second copy may be sent to the speech analytics server 44 securely without encrypting the original file, whereas the first copy to disk may be encrypted with public key infrastructure (PKI) in order to comply with Payment Card Industry Data Security Standard (PCI-DSS) requirements. The media server 24 may also provide additional metadata related to the call to the speech analytics server 44.

In other embodiments of the present invention, the media server 24 merely stores the recorded audio in the call recording storage server 42 without sending a second copy directly to the speech analytics server.

When speech analytics server 44 receives the audio data, it will perform speech analytics on the audio data (e.g., generate transcripts and/or an LVCSR output) and index the result. The speech analytics server stores metadata and indexes about the call recordings in the speech index database 46, and a user can search and/or query the speech index database 46 for audio using the search user interface (see, e.g., FIG. 2). When a particular recording is requested for playback, the requested audio is retrieved from the call recording storage server 42 (e.g., via a call recording API).

Figure 8:
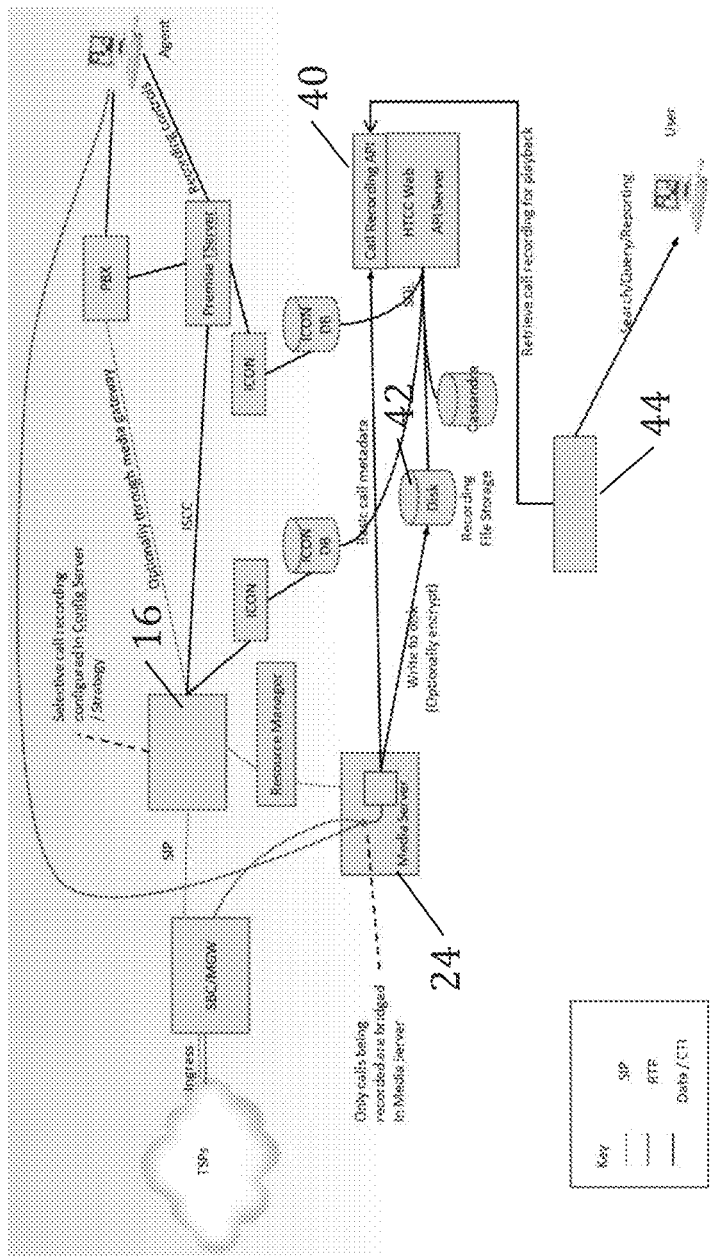
FIG. 8 is a more detailed schematic block diagram illustrating logical connections for integrating a speech analytics server with a contact center call processing system according to one embodiment of the present invention.

Referring to FIG. 8, according to another embodiment of the present invention, the call recording components can be designed to be portable to an on-premise deployment, with exception of the call recording storage server 42. For example, the call recording storage server 42 may store the recorded calls in the cloud (e.g., Amazon® S3) directly or use local, file-based call recording to host the call recording on the premise.

In some embodiments having premise deployment for call recording, the user interface for accessing call recording is the search user interface as shown, for example, in FIG. 2. In other embodiments, the user interface for dealing with call recording and analytics are converged as parts of an overall call management user interface.

Figure 9:
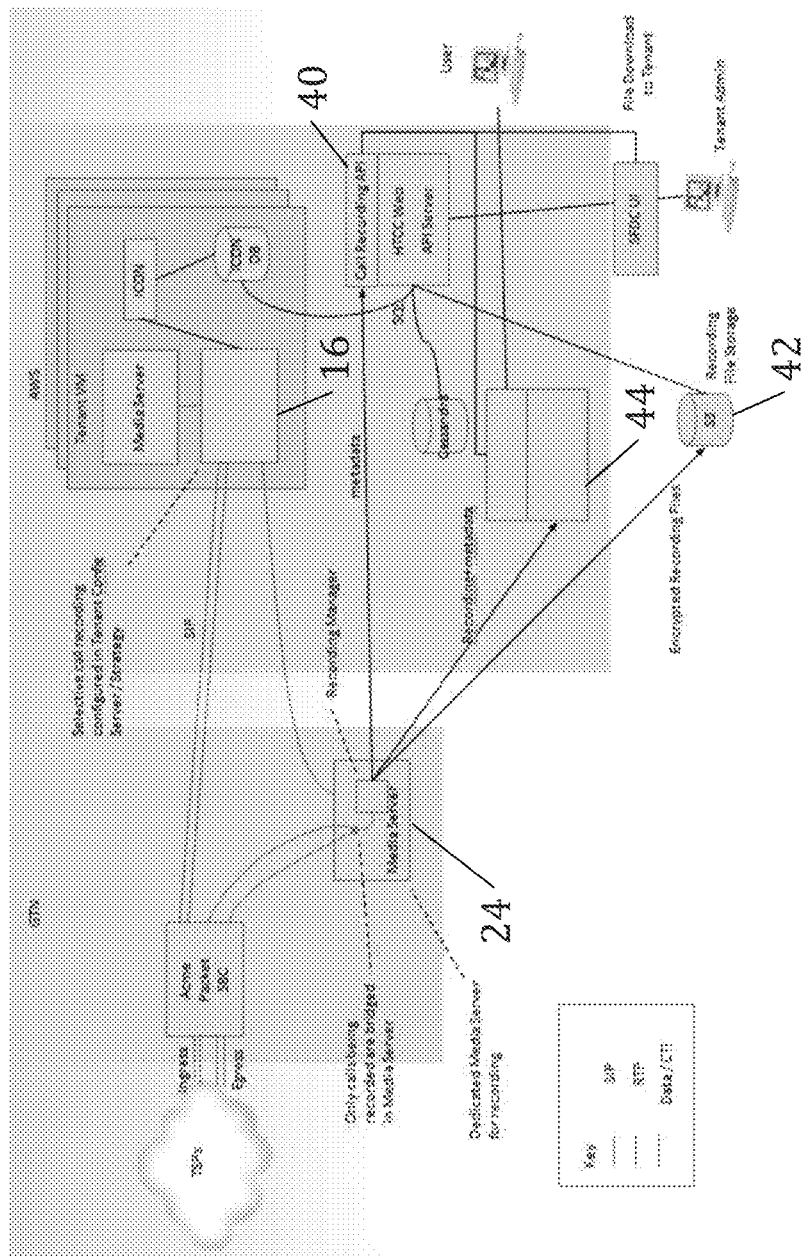
FIG. 9 is a more detailed schematic block diagram illustrating logical connections for integrating a speech analytics server with a contact center call processing system according to one embodiment of the present invention.

Referring to FIG. 9, according to another embodiment of the present invention, the cloud deployment of speech analytics integration is similar to the premise deployment with strict control of call recordings. When the speech analytics server 44 receives the call recording for performing speech analytics, audio files written by the speech analytics server 44 are encrypted with a private key only known to the speech analytics server 44.

When a new audio clip is received by the speech analytics server 44, the speech analytics server performs standard LVCSR analysis of the audio data. The LVCSR analysis of the data produces an LVCSR text output, which includes both a transcript of the audio and a confidence level for each of the words in the text output. For simplicity, an LVCSR output is generally represented as a set of 4-tuples: word, start time, end time and word confidence: LVCSR={($w_j$, $s_j$, $e_j$, $c_j$)}. Words that are in the vocabulary of the LVCSR system are generally recognized with high confidence and spoken words that correspond to OOV words are mistakenly recognized as their closest match from among words in the dictionary, and are usually with low word confidence.

The vocabulary of the LVCSR engine is the set of distinct words that appeared in the transcription files that was used to train its associated language model. This vocabulary is the largest theoretical set of words that can be recognized by a LVCSR engine using its associated language model. The vocabulary may be denoted herein as $V_{LM}$. In practice, not all of the words in $V_{LM}$ will appear in the LVCSR output, because, among other reasons, many of them have low prior probability, because the true spoken vocabulary is not as large as the LM's, or because the recognition quality is not high.

In one embodiment, the LVCSR output vocabulary $V_{LVCSR}$ is used, and the words that aren't contained in it are treated as OOV. We have then $V_{LVCSR} \subseteq V_{LM}$.

The LVCSR output is stored in the speech index database 46 and an index of words in the speech index database 46 is also updated with the LVCSR output. The index of words includes references (e.g., URIs) to audio files that contain the identified word along with timestamps indicating the times within the audio files at which the words occur (e.g., the index may be a mapping from word $w_j$ to one or more audio files {(audio_$URI_k$, $timestamp_k$)}).

Searching for a word w in a collection of audio files indexed using an LVCSR engine generally means finding all the 4-tuples having the word w as its first element. However, OOV words will not be correctly recognized by the LVCSR engine and will not be found in a search because these words will not exist in the index.

According to aspects of embodiments of the present invention, the LVCSR text output, which is composed from a set of words with associated start time, end time and a word confidence, is used to find the likely locations of OOV words within the audio to be reprocessed to determine if those sections contain the searched-for OOV words. In other words, embodiments of the present invention generate a set of anchor segments to search within.

Figure 10:
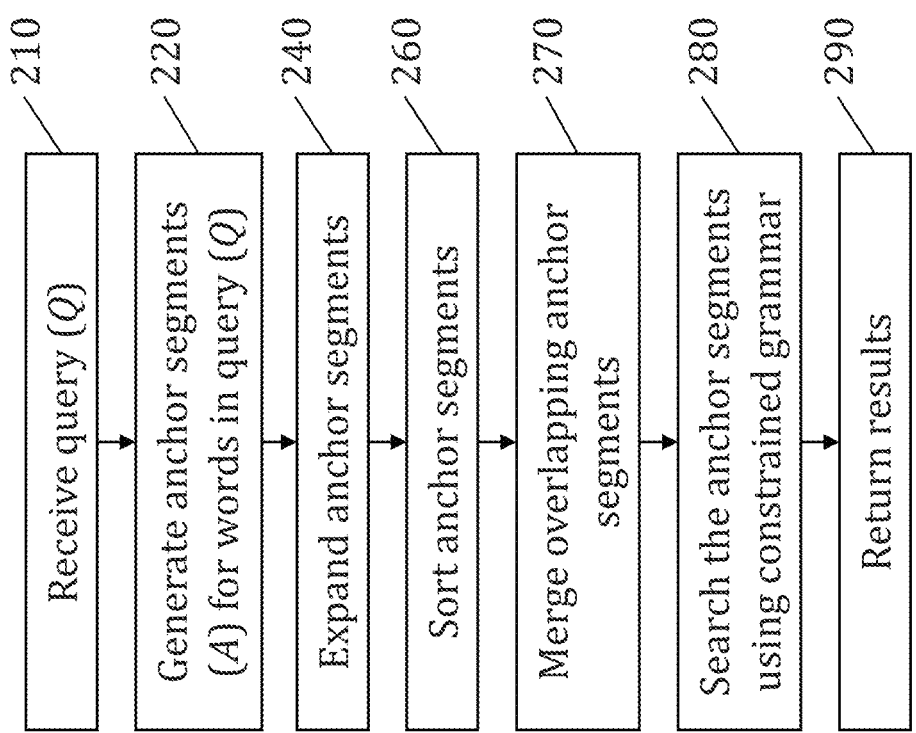
FIG. 10 is a flowchart illustrating a method of processing a search query in accordance with one embodiment of the present invention.

FIG. 10 is a flowchart illustrating a method of processing a search query in accordance with one embodiment of the present invention. In act 210, the system receives a query Q from a user (see, e.g., FIG. 2) as a search phrase. The query Q may include some words that are in the vocabulary (IV words) and words that are not in the vocabulary (OOV words).

In act 220, set of anchor segments (A) are generated for the words in the query Q, where each of the anchor segments identifies a locations within the collection of audio files corresponding to a word in the query. A method of generating the anchor segments according to one embodiment of the present invention is described in more detail below in reference to FIG. 11.

Figure 11:
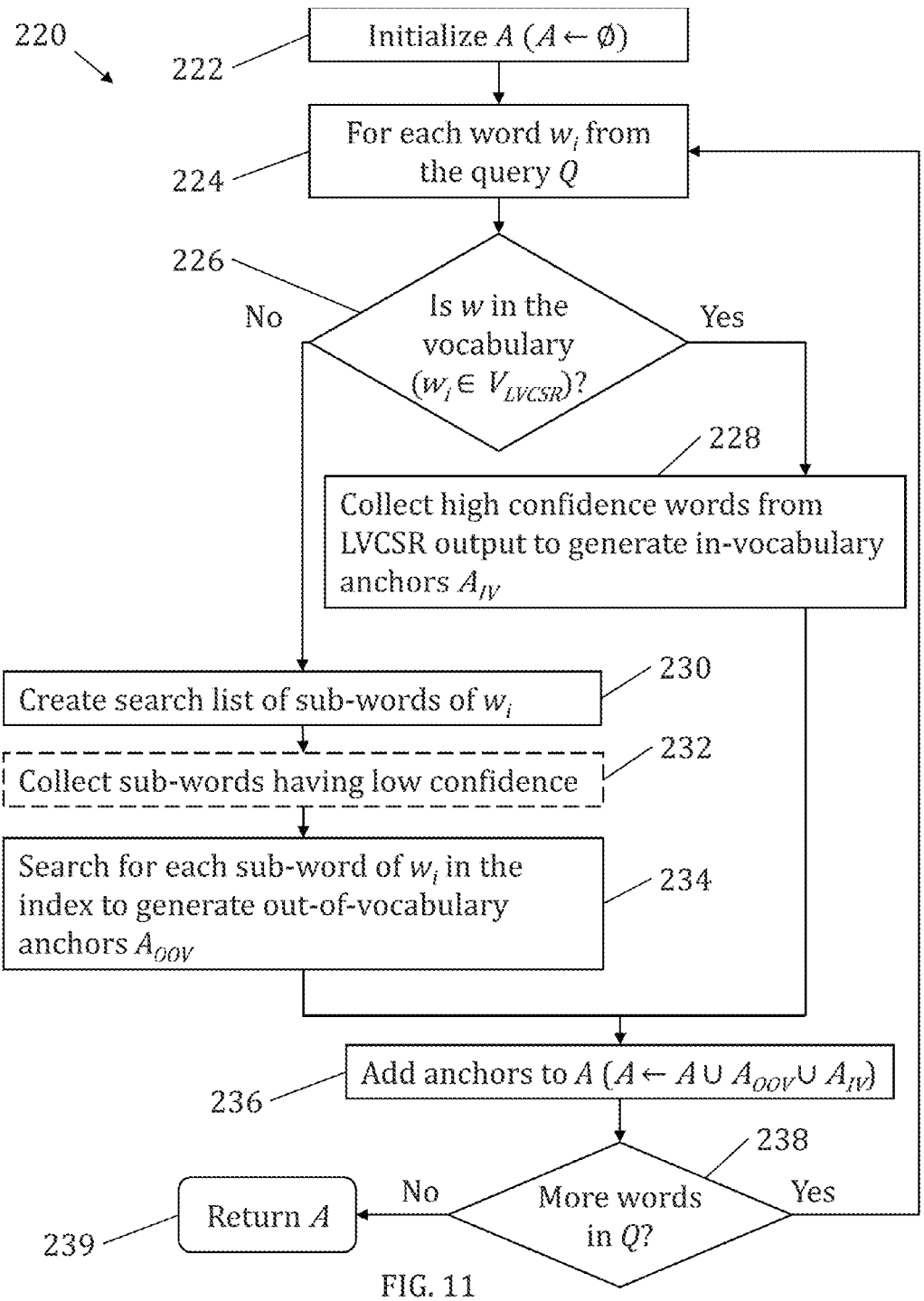
FIG. 11 is a flowchart illustrating a method of generating anchor segments for words in a search query in accordance with one embodiment of the present invention.

Referring to FIG. 11, given a received query Q and a LVCSR text outputs (previously generated when the audio was initially processed), the system generates anchor segments (A) for each of the words in the query Q. The set of anchors is initialized as an empty set in act 222 (A←∅). Then, in act 224, for each word $w_i$ in the query Q, the word $w_i$ is looked up in the LVCSR vocabulary (or dictionary) $V_{LVCSR}$ in act 226 to determine if the word $w_i$ is an OOV word or an IV word. In act 228, if $w_i$ is an IV word, then the LVCSR text output is searched for matches that are certain enough, e.g., above a given word confidence threshold. The words' locations in terms of start and end times are saved as anchors $A_{IV}$ where $A_{IV}$ is a set of anchors {$a_j$} and each anchor $a_j$ is a 3-tuple including the word $w_i$, a start time $s_j$, and an end time $e_j$ ($a_j$=($w_i$, $s_j$, $e_j$), so $A_{IV}$={($w_i$, $s_j$, $e_j$)}).

If $w_i$ is an OOV word, in act 230, a list of sub-word units of the word $w_i$ is generated. The sub-word units may be, for example, morphemes, syllables, phonemes, or a sequence of phonemes. The LVCSR output text is searched in act 234 for each sub-word of $w_i$ to generate a set of out of vocabulary anchors $A_{OOV}$. In some embodiments, in act 232, the search of the LVCSR output text is limited to words having low confidence (e.g., word confidences below a given threshold or between two given thresholds).

In one embodiment, searching the LVCSR text output is performed on a preprocessed index, e.g., a free-text index. IV words can be searched on a word-level index and OOV words can be searched on a sub-word level index. Without loss of generality, in one embodiment, the sub-word index is an index of the phoneme transcription of the LVCSR text output. In another embodiment, the OOV words can be searched in the same word-level free text index if the sub-words are word characters (e.g., instead of phonemes).

For example, if the OOV word to be searched for is "Honda" and the sub-word index is an index of the phoneme transcription of the LVCSR text output, then the phonemes of "Honda" (/h/Q/n/, /Q/n/d/, /n/d/@) will be searched for in the phoneme transcription.

On the other hand, if the sub-word index is the word-level free text index, then the strings "hon", "ond", and "nda" can be searched for in the free text index.

In act 236, all the found locations ($A_{OOV}$ or $A_{IV}$) are added to the list of anchors A (A←A∪$A_{OOV}$∪$A_{IV}$).

The query Q is then checked in act 238 to determine if there are more query words $w_i$ to be processed. If there are, then the process returns to act 224 to repeat the process with the next word $w_i$. If all of the words have been processed, then the accumulated set of anchors A is returned in act 239.

Post Processing of Anchor Segments

Figure 12:
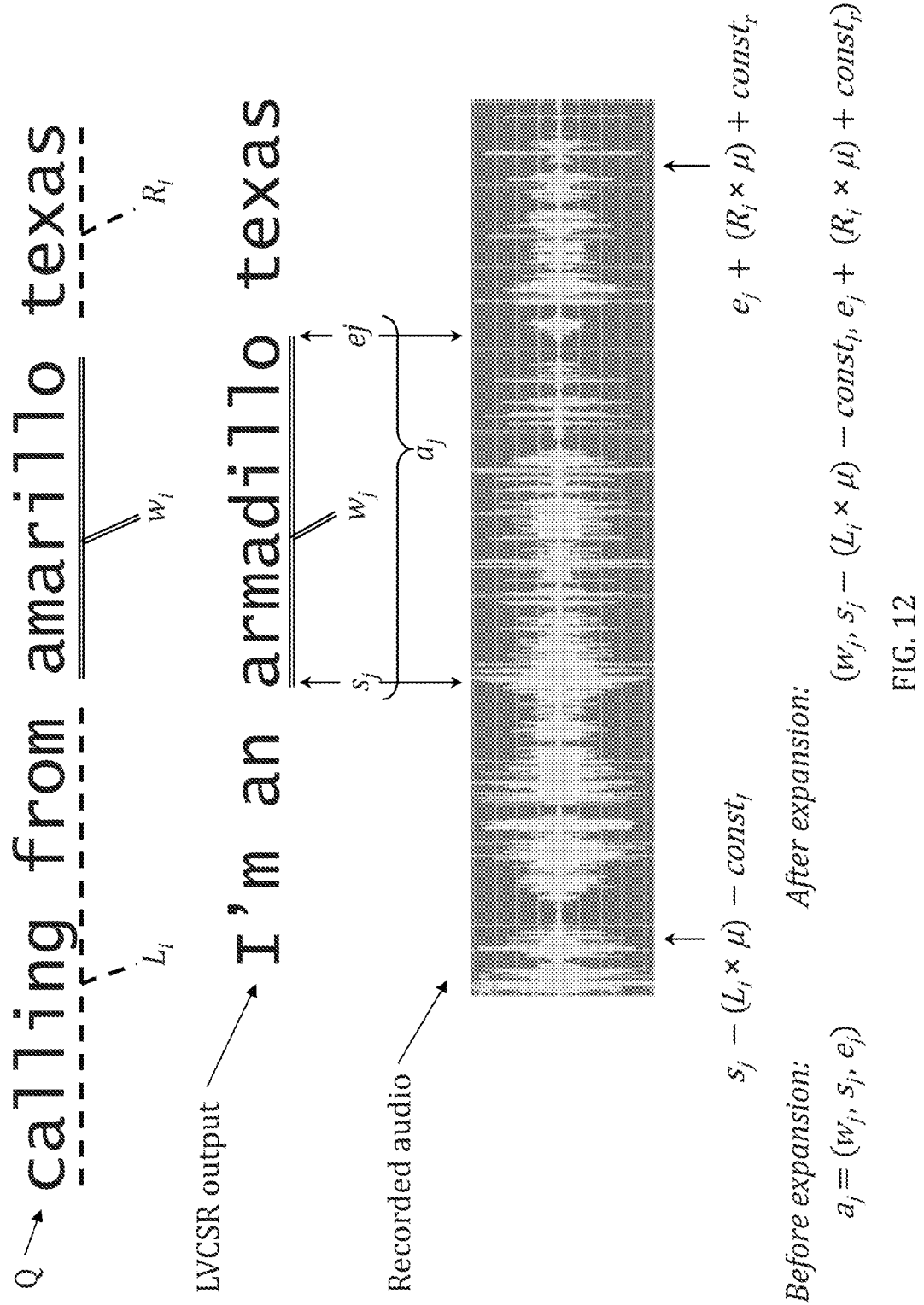
FIG. 12 is a diagram illustrating a method of expanding boundaries of anchor segments in accordance with one embodiment of the present invention.

Referring back to FIG. 10, after generating a set of anchor segments A, the anchor segments are post-processed to expand the anchor segments in act 240, sort the anchor segments in act 260, and merge the overlapping anchor segments in act 270. The expanding the anchor segments in act 240 will be described in more detail in reference to FIGS. 12 and 13. Each anchor from the list represents a small segment from the audio. This segment is usually too small to contain an entire phrase (e.g., the entire search phrase of the search query), because the anchor segments are generally the length of a single word or sub-word. As such, each audio segment is expanded before running audio recognition on it.

As such, the left and right (start and end) edges of each of the anchor segments $a_j=(w_j, s_j, e_j)$ is expanded in order to increase the likelihood that the anchor segment will contain an entire searched-for phrase. To calculate the left (start time) expansion, the number of characters $L_i$ in the query before the anchor's word is multiplied by the average spoken character duration of the language $\mu$ (e.g., the average character duration of words in the dictionary,). In certain embodiments the average character duration of the caller is computed or another best known value may be calculated or looked up from storage. A constant $const_l$ is then added to the dynamically computed expansion value.

Similarly, the right expansion is computed by multiplying the number of characters $R_i$ to the right of the anchor by $\mu$ and adding a constant $const_r$. In some embodiments, $const_l=const_r$.

In short, for each of the anchor segments $a_j=(w_j, s_j, e_j)$, the $s_j$ and $e_j$ values are expanded such that the expanded segment is $(w_j, s_j-(L_j \times \mu)-c_l, e_j+(char_{r,i} \times \mu)+c_r)$, where $c_r$ and $c_l$ are the right and left constants respectively.

Figure 13:
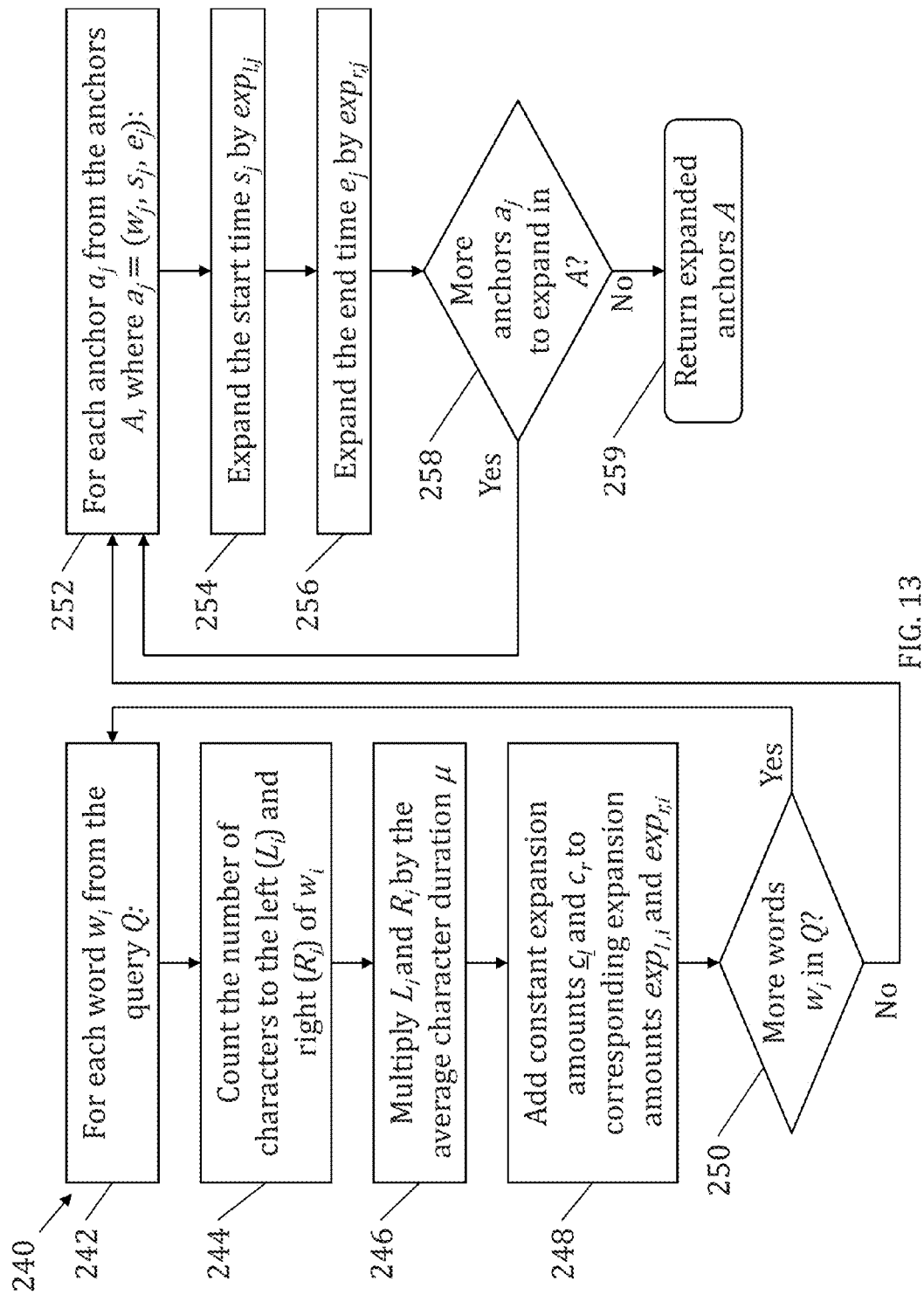
FIG. 13 is a flowchart illustrating a method of expanding boundaries of anchor segments in accordance with one embodiment of the present invention.

Referring to FIG. 13, in act 242, for each word $w_i$ of the query Q, the numbers of characters to the left and right ($L_i$ and $R_i$) of $w_i$ are counted in act 244. In act 246, the character counts $L_i$ and $R_i$ are each multiplied by the average character duration $\mu$ (computed based on, for example, an analysis of all audio data or a sample of data based on the current speaker) to obtain expansion amounts $exp_{l,i}$ and $exp_{r,i}$ which are further expanded by a constant value $const_l$ and $const_r$ in act 248. In act 250, the query Q is checked to determine if there are any more words $w_i$ to be processed. If so, then the process of acts 244, 246, and 248 is repeated for the remaining words. If not, then the process proceeds to act 252.

In act 252, for each anchor $a_j$ of the anchors A (where $a_j=(w_j, s_j, e_j)$), the start time $s_j$ is shifted (decreased) by the left expansion $exp_{l,j}$ corresponding to $w_j$ in act 254 and the end time $e_j$ is shifted (increased) by the right expansion $exp_{r,j}$ corresponding to $w_j$ in act 256 so that the expanded anchor $a_j$ has the form $(w_j, s_j-exp_{l,j}, e_j+exp_{r,j})$. In act 258, the set of anchors A is checked to determine if there are more anchors $a_j$ to be post-processed. If there are, then the process of acts 254 and 256 is repeated for the remaining anchors. If not, then the expanded anchors are returned in act 259.

Referring again to FIG. 10, the expanded anchors A are sorted by their new start times in act 260, and overlapping anchors (i.e., those with new start time that starts before the previous' new end time) are merged in act 270.

Reprocessing of Audio

In act 280, for each anchor segment $a_j$ from the above set of expanded anchors A, audio recognition is run on the anchor segment to produce search events. The recognition process can utilize the recognition technology described, for example, in U.S. Pat. No. 7,487,094 "System and method of call classification with context modeling based on composite words." Alternatively, the process can be done with other suitable phrase recognition technologies that can determine if the query word or words were spoken at the anchor location in the audio. The above method can be extended to perform recognition on multiple terms by searching in the audio for by each term separately or concurrently (e.g., simultaneously).

The recognition process takes a word or phrase (e.g., search terms in the query Q) and an audio segment (e.g., an anchor segment) and returns an event confidence level representing the confidence that the supplied audio segment contains the supplied word or phrase. As such, each of the anchor segments in the expanded anchors A is searched to determine if these segments contain the words or phrases in the query Q. As such, search times can be shortened because, for example, a reduced set of words (referred to as a "constrained grammar") that includes the query words are searched for in a reduced portion of the audio collection (e.g., only the previously anchor segments are searched). See U.S. Pat. No. 7,487,094 "System and method of call classification with context modeling based on composite words" for additional details on constrained grammars.

An event confidence is then computed for each event (e.g., each potential match) and events having an event confidence above a particular threshold are considered as hits (i.e., places in the audio that contain the searched-for query terms) and these search results are returned in act 290. When displayed, the search results can then be sorted according to their event confidence, with the highest likelihood matches shown first.

The procedure described above in FIGS. 10, 11, 12, and 13 can be described as follows:

1. $A \leftarrow \phi$
2. For each word w from the query $Q=(w_1^q, w_2^q, \ldots, w_n^q)$
   A. If $w \in V_{LVCSR}$, collect from the LVCSR words with high word confidence (word confidence above a predefined threshold), generating a set of anchors $A_{IV}=\{(w_i, s_i, e_i)\}$
   B. If $w \in V_{LVCSR}$, collect from the LVCSR words with low word confidence (word confidence between two predefined thresholds):
      Create a search list by taking sub-words of w
      Search each item from the list in the LVCSR index, generating a set of anchors $A_{OOV}$
   C. $A_w \leftarrow A_{IV} \cup A_{OOV}$
   D. $A \leftarrow A \cup A_w$
3. For each anchor, $a_i=(w_i, s_i, e_i)$, expand its boundaries to both sides:
   A. Find the relative position of the word $w_i$, in the query Q, and count the number of characters from each side of the word. Let them be $L_i$ and $R_i$ respectively.
   B. $s_i \leftarrow s_i-(L_i^* \mu + const_l)$, $e_i \leftarrow e_i+(R_i \times \mu const_r)$, where $\mu$ is an average character duration.
4. Sort the anchors according to start time and merge overlapping ones.
5. For each anchor segment from the anchors
   A. Search the segment using a constrained grammar. The search window is shifted a couple of times until it is out of scope.
   B. Compute an event confidence score for the event and compare to a threshold.

In one embodiment of the invention, it is possible for the system to get as a search query a phrase composed of only In-Vocabulary (IV) words. In this case the final recognition accuracy of the search may be improved over a classic LVCSR index-based search.

In another embodiment of the invention, the resulting anchor set is sorted according to a utility function in order to initially search in more promising anchors. Such a search can be used to provide time bounds for the search by only searching the top k anchors from the sorted list.

Embodiments of the invention can be practiced as methods or systems. Computer devices or systems including, for example, a microprocessor, memory, a network communications device, and a mass storage device can be used to execute the processes described above in an automated or semi-automated fashion. In other words, the above processes can be coded as computer executable code and processed by the computer device or system.

It should also be appreciated from the above that various structures and functions described herein may be incorporated into a variety of apparatus. In some embodiments, hardware components such as processors, controllers, and/or logic may be used to implement the described components or circuits. In some embodiments, code such as software or firmware executing on one or more processing devices may be used to implement one or more of the described operations or components.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method comprising:
   receiving, on a computer system, a text search query, the query comprising one or more query words;
   generating, on the computer system, for each query word in the query, a set of one or more anchor segments from searching metadata corresponding to a plurality of speech recognition processed audio files, the metadata including representations of one or more words detected in the audio files, wherein, for each detected word, the metadata includes a reference to each audio file in which the word was detected, a temporal location of the detected word in the audio file, and a confidence measure for the word as detected within the audio file, where each anchor segment includes a query word, an identifier for an audio file, and a temporal location of the query word within the audio file, where generating anchor segments includes, for each query word:
      determining, on the computer system, if the query word is included in a vocabulary of a learning model for a speech recognizer engine of the computer system;
      on the computer system, when the query word is in the vocabulary, searching the metadata to identify one or more high confidence anchor segments corresponding to the query word; and
      on the computer system, when the query word is not in the vocabulary:
         generating a search list of one or more sub-words of the query word,
         searching the metadata to identify one or more audio files containing at least one of the one or more sub-words to identify one or more anchor segments corresponding to one or more of the sub-words;
   post-processing, on the computer system, the one or more anchor segments, the post-processing comprising:
      expanding the one or more anchor segments;
      sorting the one or more anchor segments; and
      merging overlapping ones of the one or more anchor segments; and
   performing, on the computer system, speech recognition on the post-processed one or more expanded anchor segments for instances of at least one of the one or more query words using a constrained grammar.

2. The method of claim 1, wherein the generating the one or more anchor segments further comprises:
   collecting low confidence words in the audio files, the low confidence words having word confidences below a threshold, and
   wherein the searching the metadata to identify one or more audio files containing at least one of the one or more sub-words comprises searching the low confidence words for only the sub-words of the query word when the query word is not in the vocabulary.

3. The method of claim 1, wherein the constrained grammar comprises one or more out-of-vocabulary query words of the query, wherein each of the out-of-vocabulary query words is not in the vocabulary.

4. The method of claim 1, wherein the speech recognition includes computing one or more event confidence levels, each of the event confidence levels corresponding to a confidence that an anchor segment of the one or more anchor segments contains a particular query word of the one or more query words of the query.

5. The method of claim 4, further comprising outputting, from the computer system, a result of the speech recognition, wherein the result comprises the instances of the one or more query words in the audio file, sorted by event confidence level.

6. The method of claim 1, further comprising:
   applying, on the computer system, a utility function to each of the one or more anchor segments to compute one or more corresponding anchor utility values; and
   sorting, on the computer system, the one or more anchor segments in accordance with the one or more anchor utility values.

7. The method of claim 6, wherein the speech recognition performed on the one or more post-processed anchor segments only searches the one or more anchor segments having best anchor utility values of the one or more anchor utility values.

8. The method of claim 1, wherein the expanding the one or more anchor segments comprises:
   for each query word in the query:
      counting a first number of characters in the query before the query word and a second number of characters after the query word;
      multiplying the first number of characters by an average character duration to obtain a first expansion amount; and
      multiplying the second number of characters by the average character duration to obtain a second expansion amount; and
   for each anchor segment, each anchor segment being identified by an anchor word, a start time, and an end time:
      subtracting the first expansion amount and a first constant expansion duration from the start time; and
      adding the second expansion amount and a second constant expansion duration to the end time.

9. The method of claim 1, wherein the speech recognition performed on the one or more post-processed expanded anchor segments includes, when the query word is not in the vocabulary, re-processing, on the computer system, audio data in the audio file at the temporal location identified in the anchor segment and computing a confidence level corresponding to a confidence that the anchor segment contains the query word.

10. A system comprising a computer system comprising a processor, memory, and storage, the system being configured to:
receive a text search query, the query comprising one or more query words;
generate, for each query word in the query, a set of one or more anchor segments from searching metadata corresponding to a plurality of speech recognition processed audio files, the metadata including representations of one or more words detected in the audio files, wherein, for each detected word, the metadata includes a reference to each audio file in which the word was detected, a temporal location of the detected word in the audio file, and a confidence measure for the word as detected within the audio file, where each anchor segment includes a query word, an identifier for an audio file, and a temporal location of the query word within the audio file, where generating anchor segments includes, for each query word, the computer system:
determining if the query word is included in a vocabulary of a learning model for a speech recognizer engine of the computer system;
when the query word is in the vocabulary, searching the metadata to identify one or more high confidence anchor segments corresponding to the query word; and
when the query word is not in the vocabulary:
generating a search list of one or more sub-words of the query word,
searching the metadata to identify one or more audio files containing at least one of the one or more sub-words to identify one or more anchor segments corresponding to one or more of the sub-words;
post-process the one or more anchor segments, the post-process comprising:
expanding the one or more anchor segments;
sorting the one or more anchor segments; and
merging overlapping ones of the one or more anchor segments; and
perform speech recognition on the post-processed one or more expanded anchor segments for instances of at least one of the one or more query words using a constrained grammar.

11. The system of claim 10, wherein the system is further configured to collect low confidence words in the audio files, the low confidence words having word confidences below a threshold, and
wherein the searching the metadata to identify one or more audio files containing at least one of the one or more sub-words comprises searching the low confidence words for only the sub-words of the query word when the query word is not in the vocabulary.

12. The system of claim 10, wherein the constrained grammar comprises one or more out-of-vocabulary query words of the query, wherein each of the out-of-vocabulary query words is not in the vocabulary.

13. The system of claim 10, wherein the system is further configured to search the one or more post-processed anchor segments by computing one or more event confidence levels, each of the event confidence levels corresponding to a confidence that an anchor segment of the one or more anchor segments contains a particular query word of the one or more query words of the query.

14. The system of claim 13, wherein the system is further configured to output a result of the speech recognition, wherein the result comprises the instances of the query words in the audio file, sorted by event confidence level.

15. The system of claim 10, wherein the system is further configured to:
apply a utility function to each of the one or more anchor segments to compute one or more corresponding anchor utility values; and
sort the one or more anchor segments in accordance with the one or more anchor utility values.

16. The system of claim 15, wherein the system is configured to search the one or more post-processed anchor segments by only searching the one or more anchor segments having best anchor utility values of the one or more anchor utility values.

17. The system of claim 10, wherein the system is further configured to expand the one or more anchor segments by:
for each query word in the query:
counting a first number of characters in the query before the query word and a second number of characters after the query word;
multiplying the first number of characters by an average character duration to obtain a first expansion amount; and
multiplying the second number of characters by the average character duration to obtain a second expansion amount; and
for each anchor segment, each anchor segment being identified by an anchor word, a start time, and an end time:
subtracting the first expansion amount and a first constant expansion duration from the start time; and
adding the second expansion amount and a second constant expansion duration to the end time.

18. The system of claim 10, wherein the speech recognition performed by the system on the one or more post-processed expanded anchor segments includes, when the query word is not in the vocabulary, re-processing audio data in the audio file at the temporal location identified in the anchor segment and computing a confidence level corresponding to a confidence that the anchor segment contains the query word.

19. A system comprising
means for receiving a text search query, the query comprising one or more query words;
means for generating, for each query word in the query, a set of one or more anchor segments from searching metadata corresponding to a plurality of speech recognition processed audio files, the metadata including representations of one or more words detected in the audio files, wherein, for each detected word, the metadata includes a reference to each audio file in which the word was detected, a temporal location of the detected word in the audio file, and a confidence measure for the word as detected within the audio file, where each anchor segment includes a query word, an identifier for an audio file, and a temporal location of the query word within the audio file, where the means for generating anchor segments includes, for each query word:

means for determining if the query word is included in a vocabulary of a learning model for a speech recognizer engine of the computer system;

when the query word is in the vocabulary, means for searching the metadata to identify one or more high confidence anchor segments corresponding to the query word; and means for, when the query word is not in the vocabulary:

generating a search list of one or more sub-words of the query word, searching the metadata to identify one or more audio files containing at least one of the one or more sub-words to identify one or more anchor segments corresponding to one or more of the sub-words;

means for post-processing the one or more anchor segments comprising:

means for expanding the one or more anchor segments;

means for sorting the one or more anchor segments; and means for merging overlapping ones of the one or more anchor segments; and means for searching the post-processed one or more expanded anchor segments for instances of at least one of the one or more query words using a constrained grammar.

\* \* \* \* \*